United States Patent
Lin et al.

(10) Patent No.: US 11,151,065 B2
(45) Date of Patent: Oct. 19, 2021

(54) METHOD FOR PERFORMING DETECTION CONTROL OF WRITE PROTECTION FUNCTION OF MEMORY DEVICE, ASSOCIATED CONTROL CHIP AND ASSOCIATED ELECTRONIC DEVICE

(71) Applicant: Realtek Semiconductor Corp., HsinChu (TW)

(72) Inventors: Neng-Hsien Lin, Kaohsiung (TW); Jiunn-Hung Shiau, Taipei (TW)

(73) Assignee: Realtek Semiconductor Corp., HsinChu (TW)

(*) Notice: Subject to any disclaimer, the term of this patent is extended or adjusted under 35 U.S.C. 154(b) by 0 days.

(21) Appl. No.: 16/877,475

(22) Filed: May 18, 2020

(65) Prior Publication Data

US 2020/0387460 A1 Dec. 10, 2020

(30) Foreign Application Priority Data

Jun. 5, 2019 (TW) .................................. 108119403

(51) Int. Cl.
*G06F 13/16* (2006.01)
*G06F 13/42* (2006.01)

(52) U.S. Cl.
CPC ...... *G06F 13/1668* (2013.01); *G06F 13/4282* (2013.01); *G06F 2213/0026* (2013.01)

(58) Field of Classification Search
CPC ............. G06F 13/1668; G06F 13/4282; G06F 2213/0026
See application file for complete search history.

(56) References Cited

U.S. PATENT DOCUMENTS

| | | | |
|---|---|---|---|
| 10,339,328 B1* | 7/2019 | Hampel | G06F 21/6218 |
| 2005/0197017 A1* | 9/2005 | Chou | G06K 19/07733 |
| | | | 439/660 |
| 2006/0015673 A1 | 1/2006 | Morrow | |
| 2010/0131707 A1* | 5/2010 | Chi | G06F 13/385 |
| | | | 711/115 |
| 2011/0072185 A1* | 3/2011 | Pinto | G06F 3/0607 |
| | | | 710/315 |
| 2017/0109531 A1 | 4/2017 | Wang | |
| 2018/0276177 A1 | 9/2018 | Shiau | |

FOREIGN PATENT DOCUMENTS

TW    I638266 B    10/2018

* cited by examiner

*Primary Examiner* — Tim T Vo
*Assistant Examiner* — Harry Z Wang
(74) *Attorney, Agent, or Firm* — Winston Hsu (57) ABSTRACT

A method for performing detection control of a write protection function of a memory device, an associated control chip, and an associated electronic device are provided. The method includes: detecting whether the memory device supports a first protocol to generate an interface detection result; detecting whether a write protection switch of the memory device is turned on to generate a write protection detection result; and according to the interface detection result and the write protection detection result, selectively initializing a transmission interface of a control chip as a first transmission interface conforming to the first protocol or a second transmission interface, to allow a host device to access the memory device through the control chip, wherein the first transmission interface corresponds to a first configuration of the control chip, and the second transmission interface corresponds to a second configuration of the control chip.

14 Claims, 9 Drawing Sheets

METHOD FOR PERFORMING DETECTION CONTROL OF WRITE PROTECTION FUNCTION OF MEMORY DEVICE, ASSOCIATED CONTROL CHIP AND ASSOCIATED ELECTRONIC DEVICE

BACKGROUND OF THE INVENTION

1. Field of the Invention

The present invention is related to write protection functions of memory devices, and more particularly, to a method for performing detection control of a write protection function of a memory device, an associated control chip, and an associated electronic device.

2. Description of the Prior Art

A write protection switch is one feature of memory cards conforming to the secure digital (SD) specification (which may be referred to as an SD card for brevity). A user can directly control an SD card to be in a write protection status or a non-write protection status via this write protection switch. The switch, however, is merely a mechanical switch, which is not connected to a controller inside the SD card. Thus, in practice, the write protection function is implemented by a card reader of SD cards (referred to as an SD card reader for brevity) rather than by the SD card itself.

Conventionally, a transmission interface for an SD card is different from a high speed interface used by a host device, so the SD card reader needs to translate signal formats to allow the host device to access the SD card. As the card reader completely involves the read/write process of the SD card (including initialization), the SD card reader can implement the write protection function of the SD card. With developments in the related art, the aforementioned high speed interface has begun to be introduced in SD cards in order to improve performance, so the SD card reader no longer needs to perform the aforementioned format conversion (translation) operation. As the exterior of these SD cards conforming to the updated specification are quite similar to conventional cards, it might be hard for the user to differentiate which SD cards conform to which specifications. Thus, under a condition where the SD card reader and the SD card are compatible with both old and new specifications, there is a need for a novel method and related apparatus to implement the write protection function of the SD card.

SUMMARY OF THE INVENTION

The present invention therefore provides a method for performing detection control of a write protection function of a memory device, an associated control chip, and an associated electronic device, for implementing the write protection function under the condition where an access device is compatible with both old and new specifications.

At least one embodiment of the present invention provides a method for performing detection control of a write protection function of a memory device. The method comprises: detecting whether the memory device supports a first protocol to generate an interface detection result; detecting whether a write protection switch of the memory device is turned onto generate a write protection detection result; and according to the interface detection result and the write protection detection result, selectively initializing an transmission interface of an control chip as a first transmission interface conforming to the first protocol or a second transmission interface to allow a host device to access the memory device through the control chip, wherein the first transmission interface corresponds to a first configuration of the control chip, and the second transmission interface corresponds to a second configuration of the control chip. In addition, regarding the first configuration and the second configuration, the host device performs data transmission with the control chip according to the first protocol.

At least one embodiment of the present invention provides a control chip for accessing a memory device. The control chip comprises an interface detection module, a write protection detection terminal, and a control circuit respectively coupled to the interface detection module and the write protection detection terminal. In operations of the control chip, the interface detection module is configured to detect whether the memory device supports a first protocol to generate an interface detection result; and the write protection detection terminal is configured to monitor a write protect detection signal for detecting whether a write protection switch of the memory device is turned on to generate a write protection detection result. In addition, the control circuit selectively initializes a transmission interface of a control chip as a first transmission interface conforming to the first protocol or a second transmission interface according to the interface detection result and the write protection detection result to allow a host device to access the memory device through the control chip, wherein the first transmission interface corresponds to a first configuration of the control chip, and the second transmission interface corresponds to a second configuration of the control chip. In addition, regarding the first configuration and the second configuration, the host device performs data transmission with the control chip according to the first protocol; and regarding the second configuration.

At least one embodiment of the present invention provides an electronic device. The electronic device comprises an access device, a host device coupled to a control chip within the access device, and a specific transmission interface coupled between the control chip and the host device. In operations of the electronic device, the control chip is configured to access a memory device, and the host device performs data transmission with the control chip according to a first protocol. In addition, when a write protection switch of the memory device is turned on, the host device obtains write protection information from the control chip via the specific interface in order to enable a write protection function according to a program code.

The present invention can implement a write protection function of a memory device in an access device which is compatible with both old and new specifications. In addition, embodiments of the present invention will not greatly increase costs. Thus, the present invention can solve the problems of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a diagram illustrating a memory device being inserted into an electronic device according to an embodiment of the present invention, where a write protection switch of the memory device is turned on.

DETAILED DESCRIPTION

Figure 1:
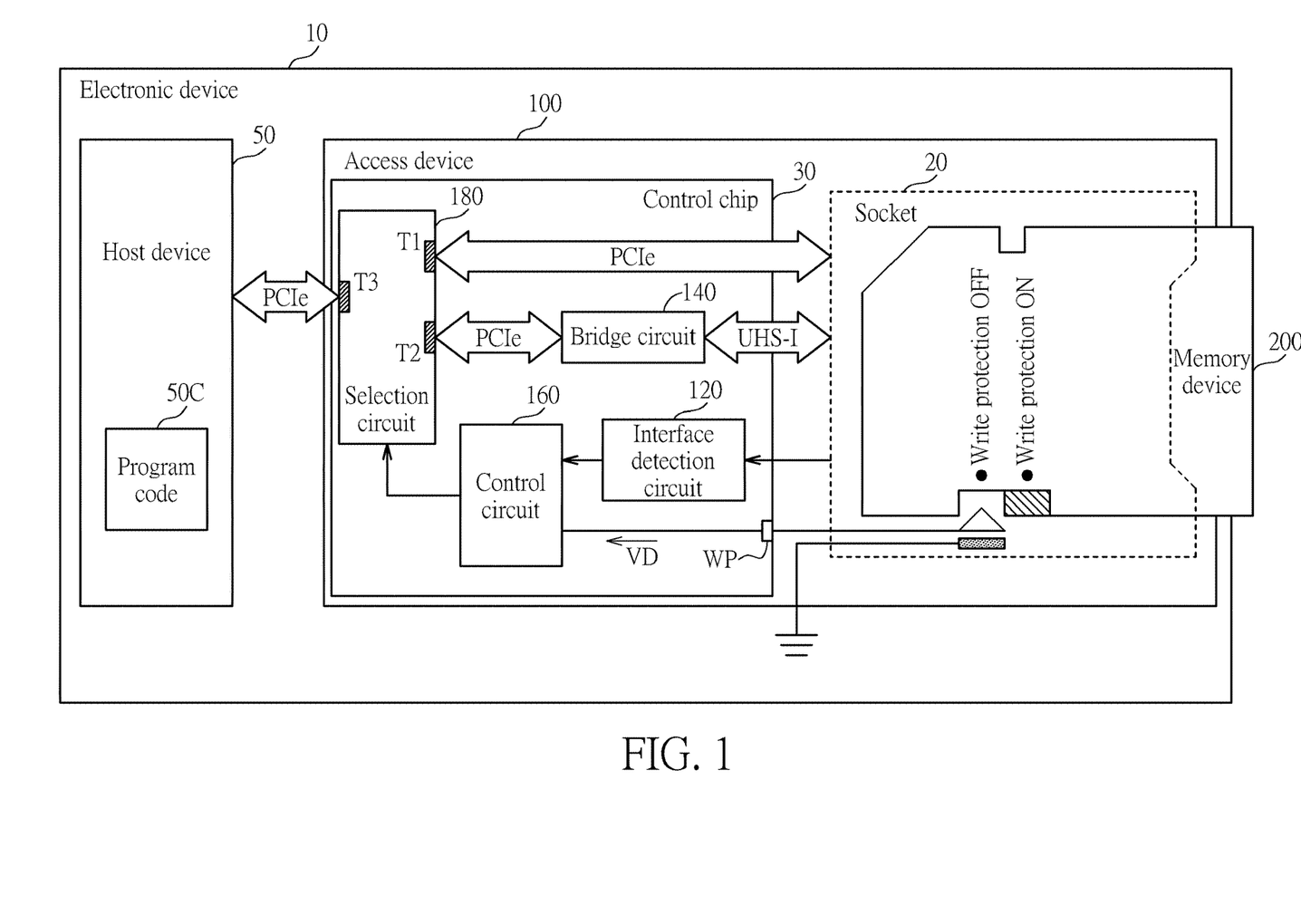
Figure 2:
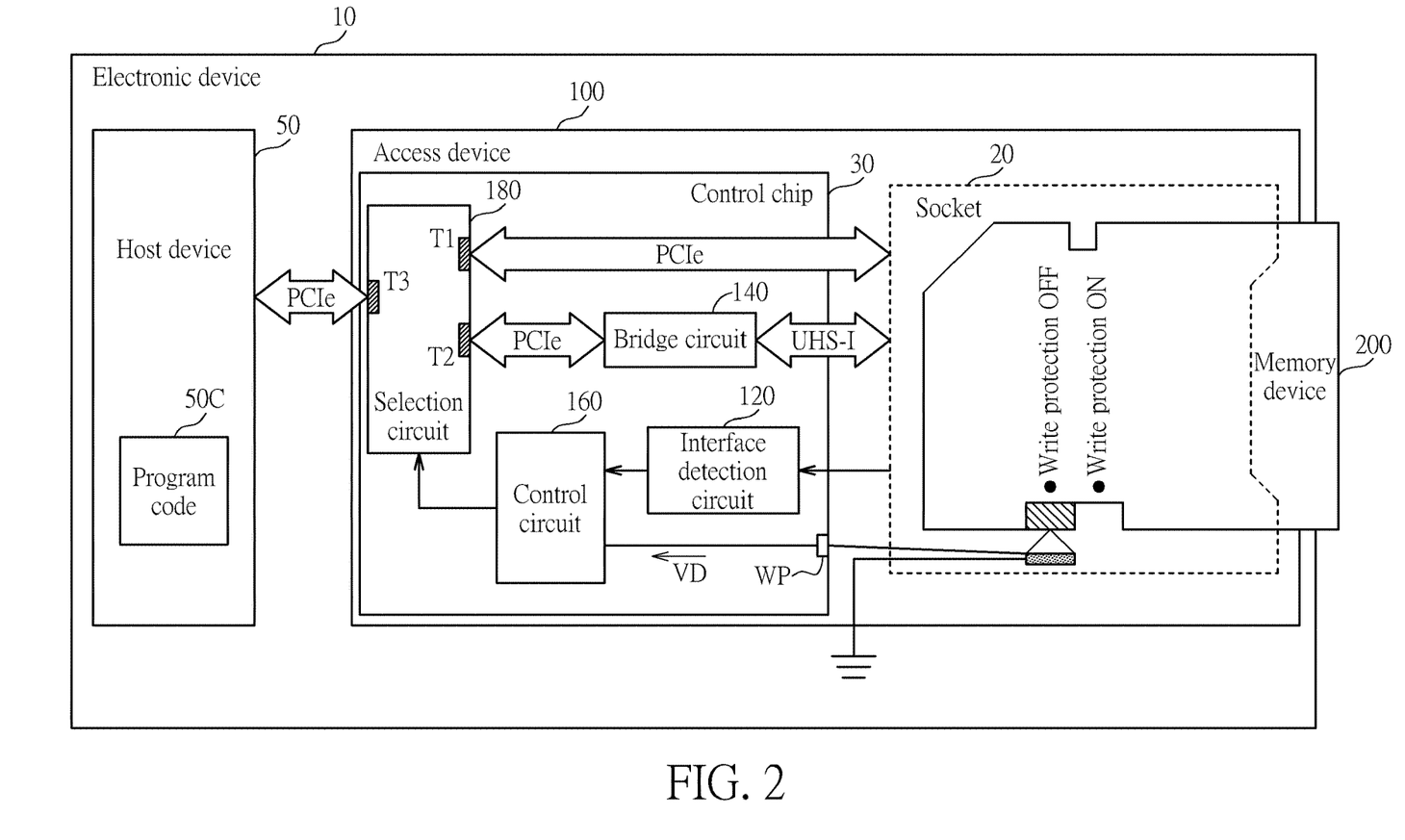
FIG. 2 is a diagram illustrating a memory device being inserted into an electronic device according to an embodiment of the present invention, where a write protection switch of the memory device is turned off.

FIG. 1 and FIG. 2 are diagrams illustrating a memory device 200 being inserted into an electronic device 10 according to embodiments of the present invention, where a write protect switch of the memory device 200 is turned on in the embodiment of FIG. 1, and is turned off in the embodiment of FIG. 2. In the embodiments shown in FIG. 1 and FIG. 2, examples of the electronic device 10 may include, but are not limited to: a laptop computer, a tablet, a mobile phone, etc., and the memory device 200 may be a memory card conforming to the secure digital (SD) specification (which is referred to as an SD card for brevity), but the present invention is not limited thereto. The electronic device comprises a host device 50 and an access device 100 coupled to the host device 50, where the host device 50 may control operations of the access device 100 according to a program code 50C (e.g. a program module of an operating system of the electronic device 10). In addition, the access device 100 may comprise a socket (or a slot) 20, and a control chip 30 coupled to the socket 20, where the socket 20 may be configured to connect the control chip 20 to the memory device 200, to allow the host device 50 to access the memory device 200 through the control chip 30.

In addition, the control chip 30 may comprise an interface detection module (such as an interface detection circuit 120), a bridge circuit 140, a control circuit 160, a selection circuit 180 and a write protection detection terminal WP, where the interface detection circuit 120 and the write protection detection terminal WP are respectively coupled to the control circuit 160, and the control circuit 160 is further coupled to the selection circuit 180, but the present invention is not limited thereto. The interface detection circuit 120 may detect whether the memory device 200 supports a first protocol such as a Peripheral Component Interconnect Express (PCIe) protocol, to generate an interface detection result. It should be noted that a block diagram of the interface detection circuit 120 depicted in this embodiment is for illustrative purposes only, and is not a limitation of the present invention. In some embodiments, the interface detection circuit 120 may be implemented as a portion of the control circuit 160, but the present invention is not limited thereto. In addition, the interface detection circuit 120 is not limited to being implemented by hardware or software (e.g. taking an interface signal as a determination condition), and any implementation which can assist the access device 100 (e.g. the control chip 30) to detect whether the memory device 200 supports the first protocol belongs to the scope of the present invention. The write protection detection terminal WP may be configured to monitor a write protection signal VD for detecting whether a write protection switch of the memory device 200 is turned on, for generating a write protection detection result, where the write protection detection terminal WP may be coupled to a pin of the control chip 30, in order to provide the control chip 30 with the write protection detection signal VD. In the embodiment shown in FIG. 1, as the write protection switch is turned on, a voltage level of the write protection detection signal VD is maintained at a default voltage level (e.g. 3.3V); in the embodiment shown in FIG. 2, as the write protection switch is turned off, the voltage level of the write protection detection signal VD may be pulled to a voltage level (e.g. a ground voltage level) different from the default voltage level. The write protection detection terminal may generate the write protection detection result by monitoring the voltage level of the write protection detection signal VD. In these embodiments, the voltage level of the write protection detection signal VD may vary according to the selected socket 20, and the implementation of pulling down the voltage level of the write protection detection signal VD to the ground voltage level is one implementation only, but the present invention is not limited thereto. In addition, a set of first terminals T1 of the selection circuit 180 is coupled to the socket 20, and the bridge circuit 140 is coupled between a set of second terminals T2 of the selection circuit 180 and the socket 20. It should be noted that the set of first terminals T1 of the selection circuit 180 performs communications with the socket 20 (e.g. the memory device 200 inserted into the socket 20) according to the PCIe protocol (labeled "PCIe" in figures); additionally, the set of second terminals T2 of the selection circuit 180 performs communications with the bridge circuit 140 according to the PCIe protocol (labeled "PCIe" in figures), and the bridge circuit 140 performs communications with the socket 20 (e.g. the memory device 200 inserted into the socket 20) according to a second protocol different from the PCIe protocol, e.g. the ultra high speed type-I (UHS-I), ultra high speed type-II (UHS-II) or ultra high speed type-III (UHS-III) protocol. For brevity, the present invention takes the UHS-I protocol (labeled "UHS-I" in figures) for illustration, but the present invention is not limited thereto. The host device 50 is coupled to a set of third terminals T3 of the selection circuit 180, and performs data transmission with the control chip 30 according to the PCIe protocol.

The control circuit 160 generates a control signal according to the interface detection result and the write protection detection result to control the selection circuit 180 to initialize a transmission interface of the control chip 30 as a first transmission interface conforming to a first protocol, or a second transmission interface, for allowing the host device 50 to access the memory device 200 through the control chip 30, wherein the first transmission interface corresponds to a first configuration of the control chip 30, and the second transmission interface corresponds to a second configuration of the control chip 30. More specifically, in the first configuration of the control chip 30, the control circuit 160 controls the selection circuit 180 to couple the set of third terminals T3 to the set of first terminals T1, forming the first transmission interface via a data transmission path of the set of third terminals T3, the set of first terminals T1 and the socket 20, where the first transmission interface is a bypass path without performing protocol translation, and the host device 50 may directly access the memory device 200 via a PCIe interface at this moment. In the second configuration of the control chip 30, the control circuit 160 controls the selection circuit 180 to couple the set of third terminals T3 to the set of second terminals T2 forming the second transmission interface via a data transmission path of the set of third terminals T3, the set of second terminals T2, the bridge circuit 140 and the socket 20, where the second transmission interface utilizes the bridge circuit 140 to perform translation between the PCIe protocol and the UHS-I protocol. It should be noted that, as the bridge circuit 140 directly involves read/write operations of the memory device 200, the control circuit 160 may detect the write protection status via the write protection detection terminal WP to allow the control chip 30 to implement the write protection function via the bridge circuit 140 (e.g., set the memory device 200 to be a read-only memory). That is, the write protection function can be implemented in the second configuration of the control chip 30, and cannot be implemented in the first configuration.

Figure 3:
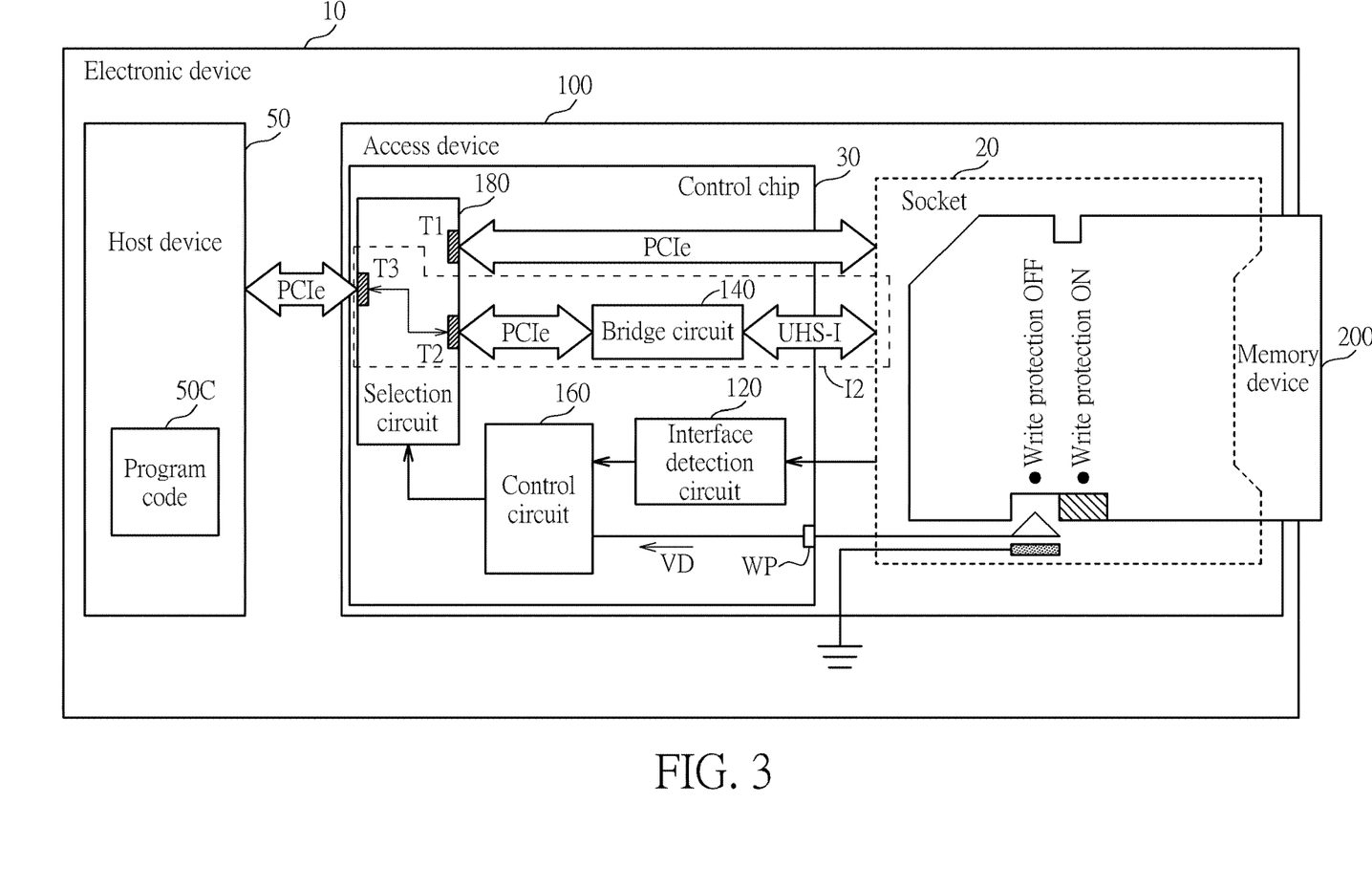
FIG. 3 is a diagram illustrating a configuration of a control chip according to an embodiment of the present invention.
Figure 4:
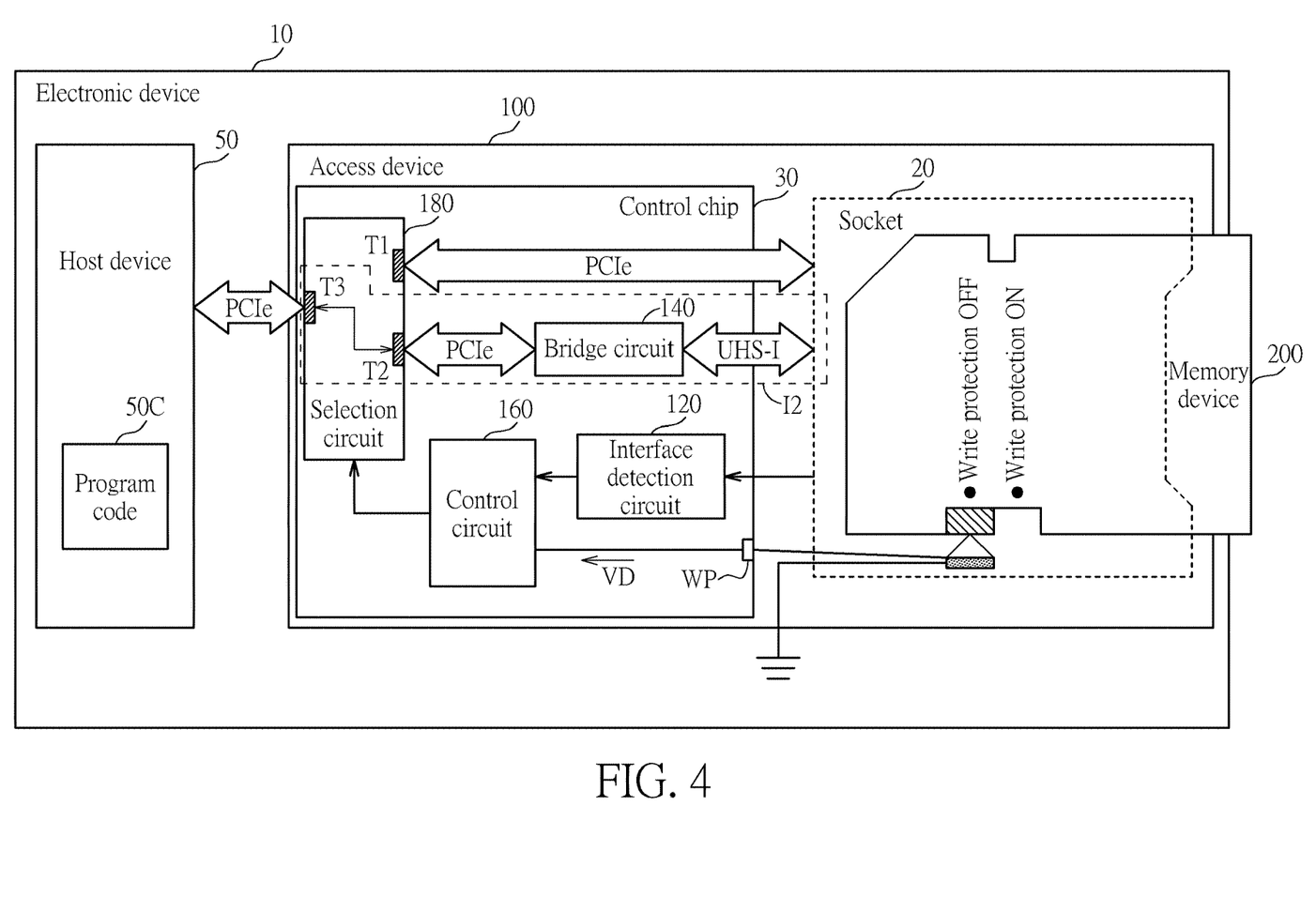
FIG. 4 is a diagram illustrating a configuration of a control chip according to another embodiment of the present invention.
Figure 5:
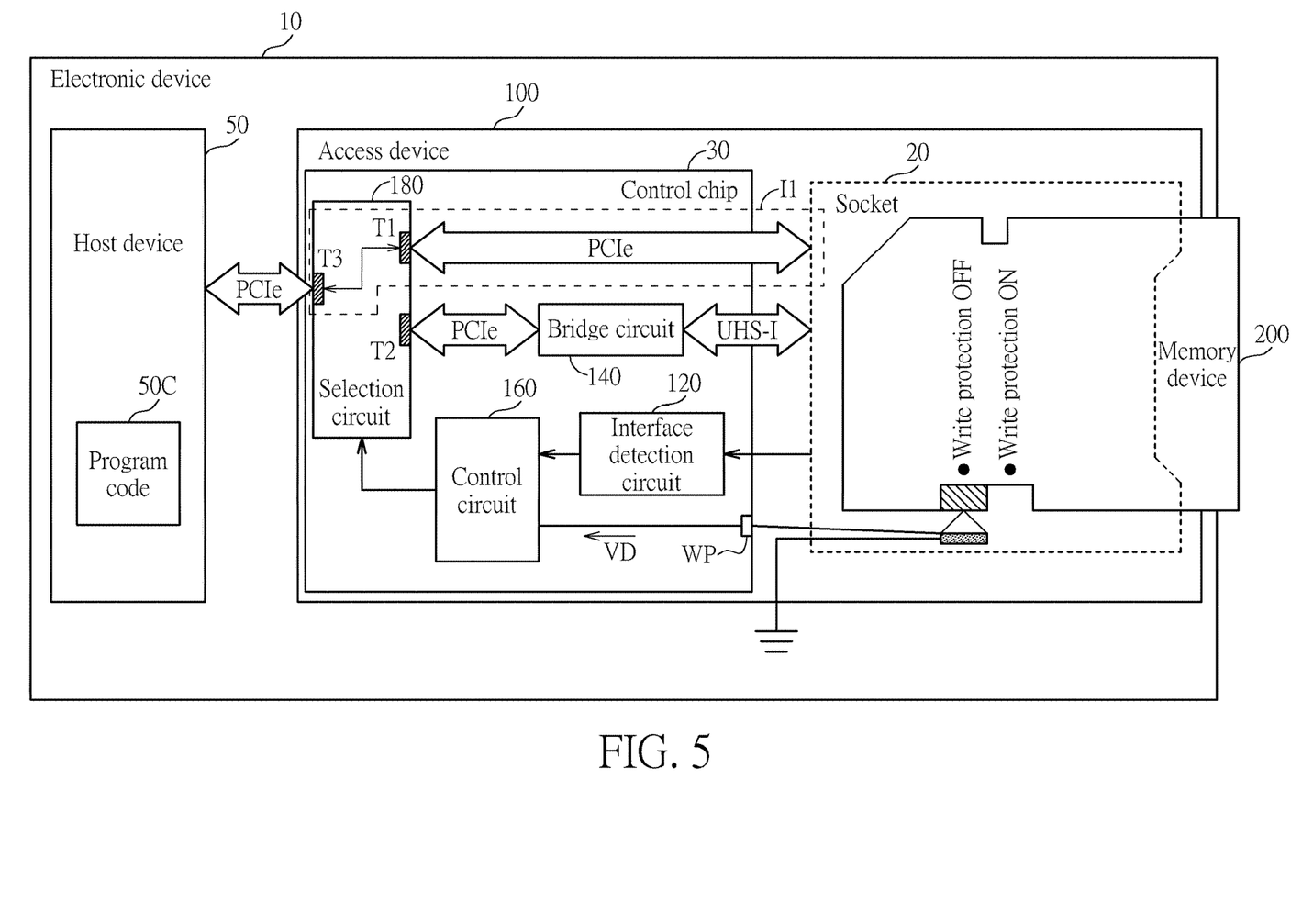
FIG. 5 is a diagram illustrating a configuration of a control chip according to yet another embodiment of the present invention.

For better comprehension, refer to FIG. 3, FIG. 4 and FIG. 5. In the embodiment of FIG. 3, the write protection switch is turned on, so no matter whether the memory device 200 supports the PCIe protocol or not, the control circuit 160 may control the selection circuit 180 to initialize the transmission interface of the control chip 30 as the second transmission interface such as a transmission interface I2, to allow the control chip to implement the write protection function via the bridge circuit 140, where the host device may access the memory device 200 via the transmission interface I2 under this condition. In the embodiment of FIG. 4, the write protection switch is turned off, where the memory device 200 supports the UHS-I protocol and does not support the PCIe protocol. Under this condition, the control circuit 160 may control the selection circuit 180 to initialize the transmission interface of the control chip 30 as the second transmission interface such as the transmission interface I2, to allow the host device 50 to access the memory device 200 via the transmission interface I2 of the control chip 30. In the embodiment of FIG. 5, the write protection switch is turned off and the memory device 200 supports the PCIe protocol. The control circuit 160 may control the selection circuit 180 to initialize the transmission interface of the control chip 30 as the first transmission interface such as a transmission interface I1 (e.g. the PCIe interface), to allow the host device 50 to access the memory device 200 via the transmission interface I1 of the control chip 30.

Figure 6:
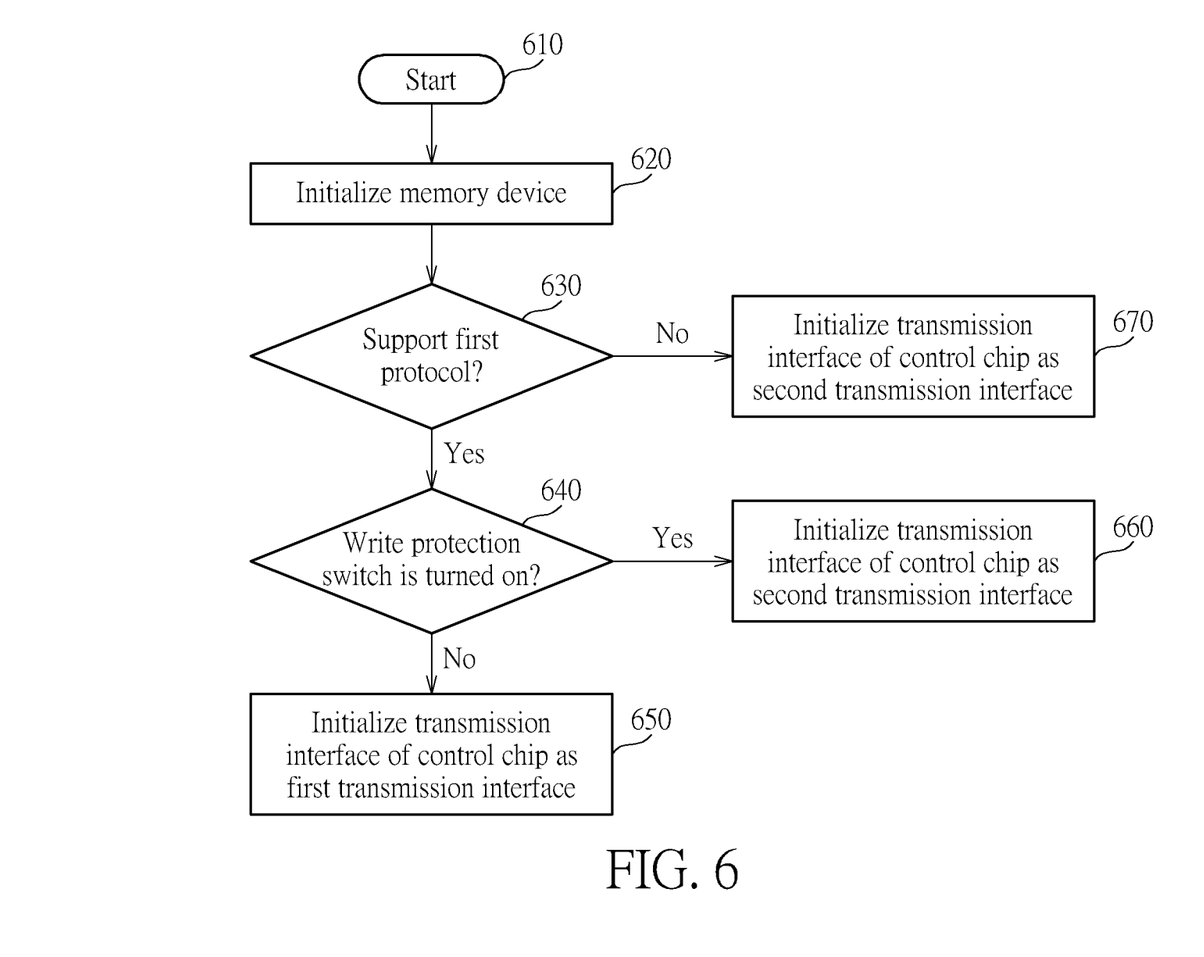
FIG. 6 is a flowchart illustrating a method for performing detection control of a write protection function of a memory device according to an embodiment of the present invention.

Refer to FIG. 6 in conjunction with FIG. 3 to FIG. 5, where FIG. 6 is a flowchart illustrating a method for performing detection control of a write protection function of the memory device 200 according to an embodiment of the present invention.

Step 610: when the memory device 200 is inserted, the flow starts.

Step 620: initialize the memory device 200.

Step 630: detect whether the memory device 200 supports a first protocol such as the PCIe protocol. If yes, enter Step 640; otherwise, enter Step 670.

Step 640: detect whether a write protection switch is turned on. If yes, enter Step 660; otherwise, enter Step 650.

Step 650: initialize a transmission interface of the control chip 30 as the transmission interface I1 as shown in FIG. 5.

Step 660: initialize the transmission interface of the control chip 30 as the transmission interface I2 as shown in FIG. 3.

Step 670: initialize the transmission interface of the control chip 30 as the transmission interface I2 as shown in FIG. 4.

Figure 7:
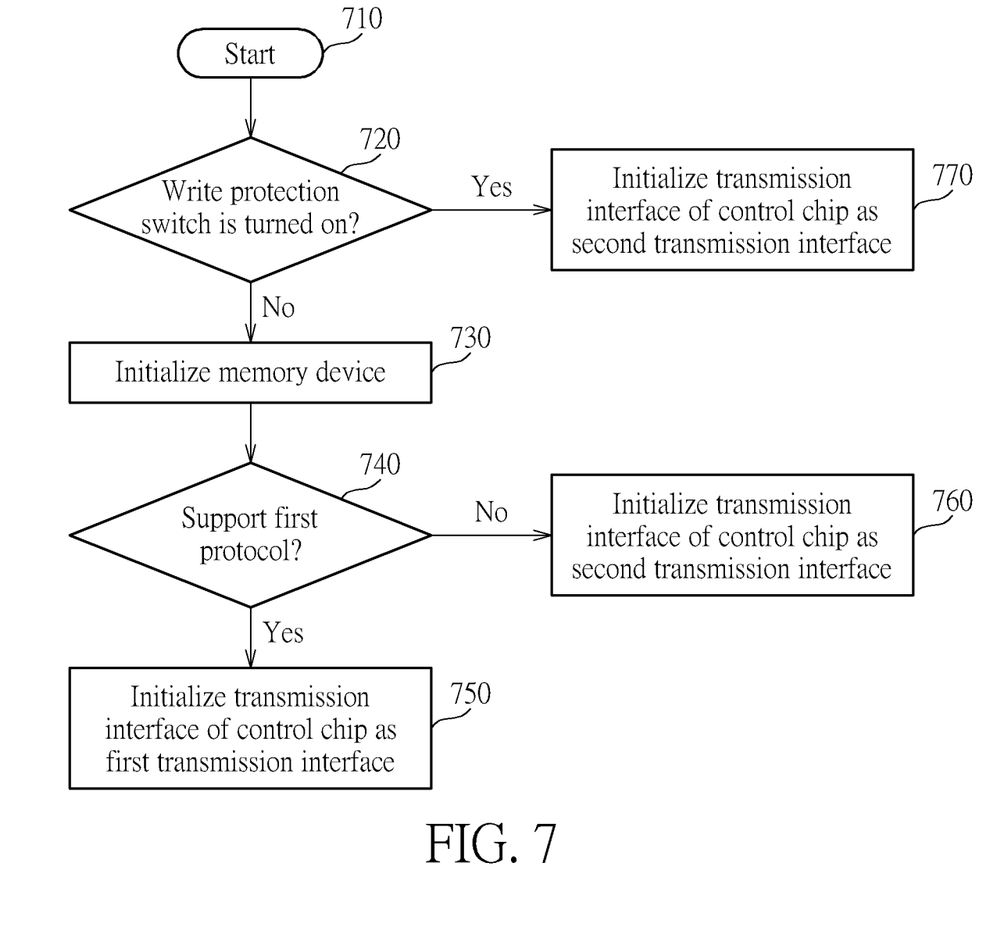
FIG. 7 is a flowchart illustrating a method for performing detection control of a write protection function of a memory device according to another embodiment of the present invention.

Refer to FIG. 7 in conjunction with FIG. 3 to FIG. 5, where FIG. 7 is a flowchart illustrating a method for performing detection control of a write protection function of the memory device 200 according to another embodiment of the present invention.

Step 710: when the memory device 200 is inserted, the flow starts.

Step 720: detect whether a write protection switch of the memory device 200 is turned on. If yes, enter Step 770; otherwise, enter Step 730.

Step 730: initialize the memory device 200.

Step 740: detect whether the memory device 200 supports a first protocol such as the PCIe protocol. If yes, enter Step 750; otherwise, enter Step 760.

Step 750: initialize a transmission interface of the control chip 30 as the transmission interface I1 as shown in FIG. 5.

Step 760: initialize the transmission interface of the control chip 30 as the transmission interface I2 as shown in FIG. 4.

Step 770: initialize a transmission interface of the control chip 30 as the transmission interface I2 as shown in FIG. 3.

Figure 8:
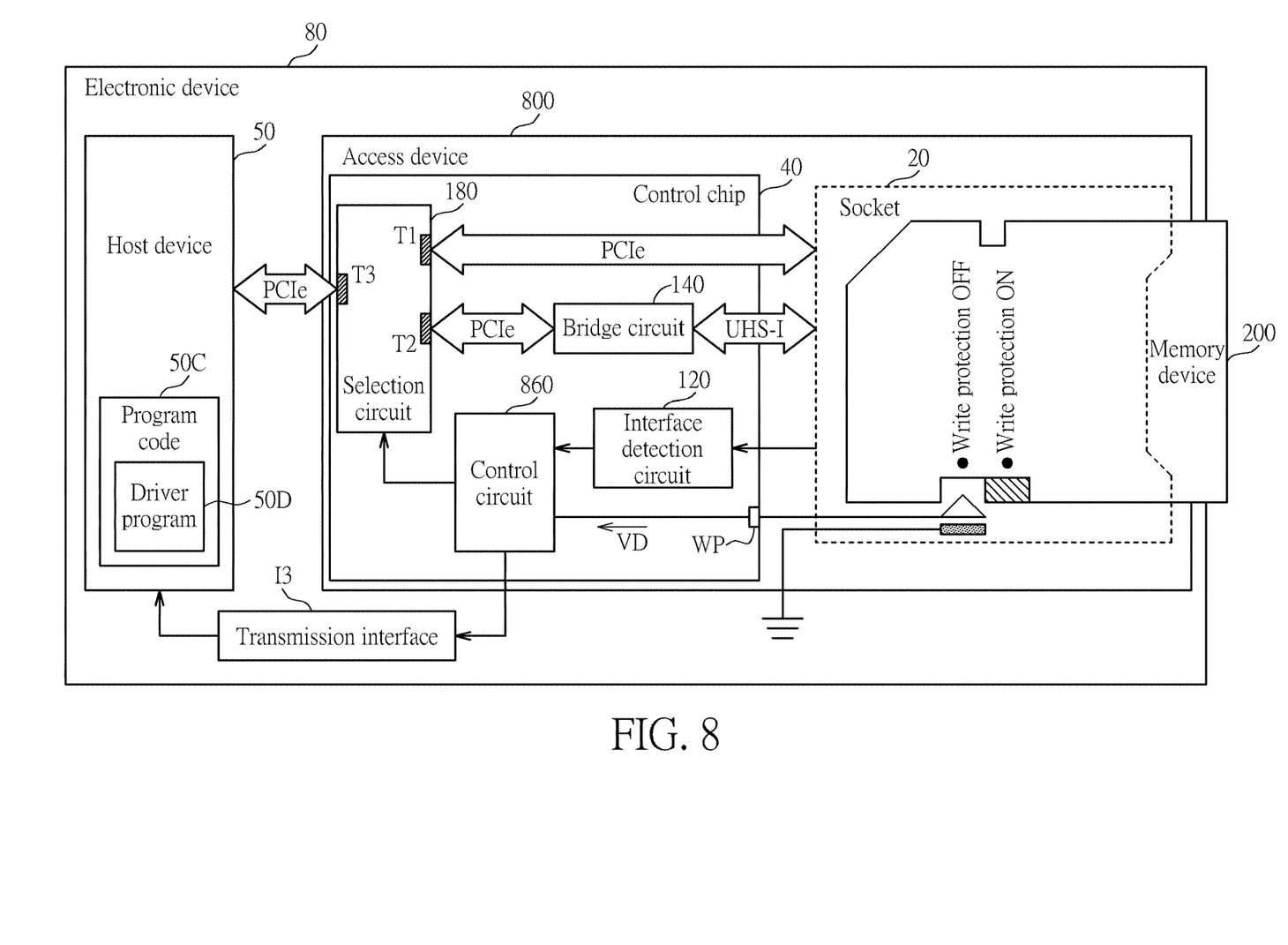
FIG. 8 is a diagram illustrating a memory device being inserted into an electronic device according to an embodiment of the present invention.

FIG. 8 is a diagram illustrating the memory device 200 being inserted into the electronic device 80 according to an embodiment of the present invention. As shown in FIG. 8, the architecture of the access device 800 may be obtained by modifying the access device 100 in the aforementioned embodiments, where the main difference is a control circuit 860 of a control chip 40 within the access device 800 controls the selection circuit 180 according to an interface detection result generated by the interface detection circuit 120 only. It should be noted that the block diagram of the interface detection circuit 120 depicted in this embodiment is for illustrative purposes only, and is not a limitation of the present invention. In some embodiments, the interface detection circuit 120 may be implemented as a portion of the control circuit 860, but the present invention is not limited thereto. In addition, the interface detection circuit 120 is not limited to being implemented by hardware or software (e.g. taking an interface signal as a determination condition), and any implementation which can assist the access device 800 (e.g. the control chip 40) to detect whether the memory device 200 supports the first protocol belongs to the scope of the present invention.

The electronic device 80 further comprises a transmission interface I3 coupled between the host device 50 and the control chip 40 (e.g. the control circuit 860 therein). In this embodiment, the write protection function is not directly implemented by the control chip 40, but is instead converted into a command manner to transmit write protection information of the corresponding write protection detection signal to the host device via the transmission interface I3, and the host device implements the write protection function in a software manner. More specifically, the program code 50C may comprise a driver program 50D corresponding to the transmission interface I3, which can control the host device 50 for determining whether a write protection switch of a memory device (such as the memory device 200) is turned on when this memory device is detected to be inserted into the socket 20. When the write protection switch of the memory device 200 is turned on, the host device 50 may obtain write protection information from the control chip 40 via the transmission interface I3, in order to enable a write protection function according to the program code 50D to set the memory device 200 as a read-only memory.

In this embodiment, the transmission interface I3 may be implemented by a General-Purpose Input/Output (GPIO), a System Management Bus (SMBus), an Inter-Integrated Circuit (I2C) Bus, a Universal Serial Bus (USB), or a PCIe interface, but the present invention is not limited thereto.

Figure 9:
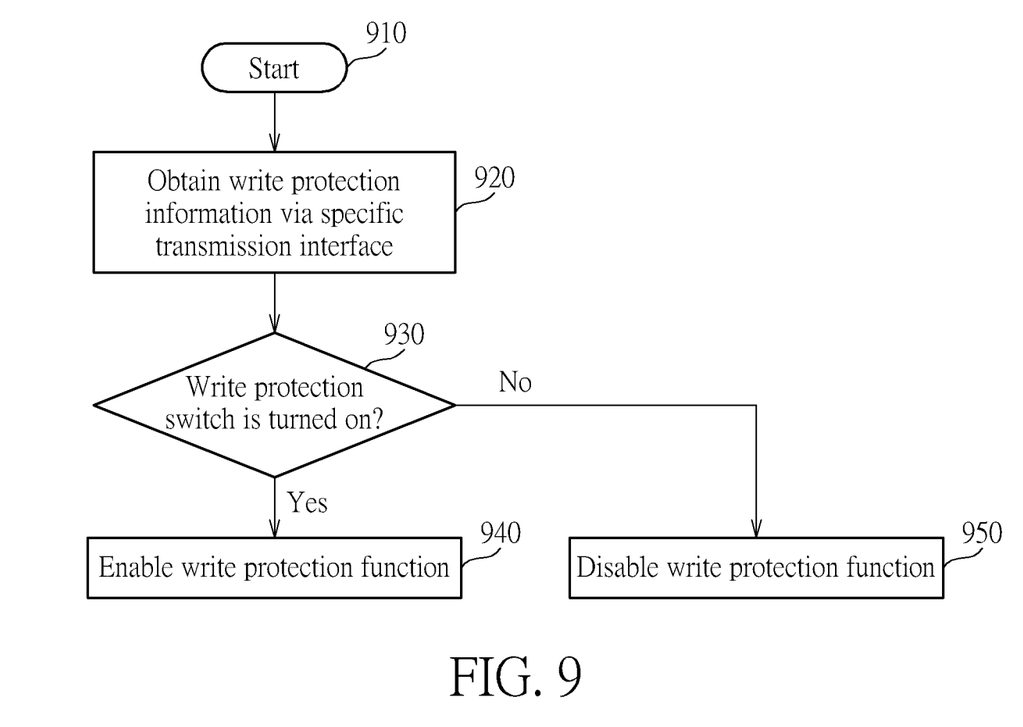
FIG. 9 is a flowchart illustrating a method for performing detection control of a write protection function of a memory device according to an embodiment of the present invention.

FIG. 9 is a flowchart illustrating a method for performing detection control of a write protection function of the memory device 800 according to an embodiment of the present invention.

Step 910: the driver program 50D running on the host device detects a memory device, and the flow starts.

Step 920: obtain write protection information via a specific transmission interface (such as the transmission interface I3).

Step 930: determine whether a write protection switch is turned on according to the write protection information. If yes, enter Step 940; otherwise, enter Step 950.

Step 940: enable a write protection function.

Step 950: disable the write protection function.

In some embodiments, the transmission interface I3 may be further coupled to a temperature sensing device (not shown) within the control chip 40. For example, the control chip 40 may utilize the temperature sensing device therein to monitor temperature information of the access device 800 or temperature information of the memory device 200, and the transmission interface I3 can transmit related temperature information to the host device. This can allow the host device to enable corresponding operations for preventing the memory device 200 from performance degradation or even being damaged due to the temperature being too high when an operating temperature or environment temperature of the access device 800 or the memory device 200 is greater than a temperature threshold, but the present invention is not limited thereto. In another embodiment, the host device 50 provides the driver program 50D with the temperature information for determination, and selects an optimal mode through communication of the transmission interface I3 and the control chip 40, but the present invention is not limited thereto.

In some embodiments, the transmission interface I3 may assist the host device to perform error handling. For example, when the program code 50C or the driving program 50D within the host device 50 detects that there is an error in the transmission process, the host device 50 can control the control chip 40 via the transmission interface I3 to perform corresponding modifications (e.g. lowering the speed) to solve the aforementioned problems, but the present invention is not limited thereto.

To summarize, the present invention provides a method, an access device comprising a control chip, and an electronic device comprising the access device, wherein the access device is allowed to normally enable and disable the write protection function under a condition where the access device is compatible with both old and new specifications (e.g. applicable to memory cards conforming to new and old specifications). The embodiments of the present invention will not greatly increase additional costs. Thus, the present invention can solve the problems of the related art without introducing any side effect or in a way that is less likely to introduce side effects.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for performing detection control of a write protection function of a memory device, comprising:
    detecting whether the memory device supports a first protocol, to generate an interface detection result;
    detecting whether a write protection switch of the memory device is turned on, to generate a write protection detection result; and
    according to the interface detection result and the write protection detection result, selectively initializing a transmission interface of a control chip as a first transmission interface conforming to the first protocol or a second transmission interface, to allow a host device to access the memory device through the control chip, wherein the first transmission interface corresponds to a first configuration of the control chip, and the second transmission interface corresponds to a second configuration of the control chip, wherein:
        regarding the first configuration and the second configuration, the host device performs data transmission with the control chip according to the first protocol;
        in response to the interface detection result indicating the memory device does not support the first protocol, the transmission interface of the control chip is initialized as the second transmission interface;
        in response to the write protection detection result indicating the write protection switch is turned on and the interface detection result indicating the memory device supports the first protocol, the transmission interface of the control chip is initialized as the second transmission interface; and
        in response to the write protection detection result indicating the write protection switch is turned off and the interface detection result indicating the memory device supports the first protocol, the transmission interface of the control chip is initialized as the first transmission interface.

2. The method of claim 1, wherein the memory device is a memory card conforming to a secure digital (SD) specification, and the first transmission interface is a Peripheral Component Interconnect Express (PCIe) interface.

3. The method of claim 1, wherein the first transmission interface is a bypass path without performing protocol translation.

4. The method of claim 1, wherein the second transmission interface utilizes a bridge circuit within the control chip to perform a translation between a second protocol and the first protocol.

5. A control chip for accessing a memory device, comprising:
    an interface detection circuit, configured to detect whether the memory device supports a first protocol, to generate an interface detection result;
    a write protection detection terminal, configured to monitor a write protect detection signal for detecting whether a write protection switch of the memory device is turned on, to generate a write protection detection result; and
    a control circuit, coupled to the interface detection circuit and the write protection detection terminal, configured to selectively initialize a transmission interface of a control chip as a first transmission interface conforming to the first protocol or a second transmission interface according to the interface detection result and the write protection detection result, to allow a host device to access the memory device through the control chip, wherein the first transmission interface corresponds to a first configuration of the control chip, and the second transmission interface corresponds to a second configuration of the control chip, wherein:

regarding the first configuration and the second configuration, the host device performs data transmission with the control chip according to the first protocol;

in response to the interface detection result indicating the memory device does not support the first protocol, the transmission interface of the control chip is initialized as the second transmission interface;

in response to the write protection detection result indicating the write protection switch is turned on and the interface detection result indicating the memory device supports the first protocol, the transmission interface of the control chip is initialized as the second transmission interface; and in response to the write protection detection result indicating the write protection switch is turned off and the interface detection result indicating the memory device supports the first protocol, the transmission interface of the control chip is initialized as the first transmission interface.

6. The control chip of claim 5, wherein the memory device is a memory card conforming to a secure digital (SD) specification, and the first transmission interface is a Peripheral Component Interconnect Express (PCIe) interface.

7. The control chip of claim 5, wherein the first transmission interface is a bypass path without performing protocol translation.

8. The control chip of claim 5, wherein the second transmission interface utilizes a bridge circuit within the control chip to perform a translation between a second protocol and the first protocol.

9. An electronic device, comprising:

an access device, comprising a control chip for accessing a memory device, wherein the control chip comprises:

an interface detection circuit, configured to detect whether the memory device supports a first protocol, to generate an interface detection result;

a write protection detection terminal, configured to monitor a write protect detection signal for detecting whether a write protection switch of the memory device is turned on; and a control circuit, coupled to the interface detection circuit and the write protection detection terminal, wherein when the interface detection result indicates the memory device supports the first protocol, the control chip initializes a transmission interface of the control chip as a first transmission interface conforming to the first protocol; otherwise, the control chip initializes the transmission interface of the control chip as a second transmission interface;

a host device, coupled to the control chip via the transmission interface of the control chip, wherein the host device performs data transmission with the control chip according to a first protocol, and the host device accesses the memory device via the transmission interface of the control chip; and a specific transmission interface, coupled between the control chip and the host device, wherein when a write protection switch of the memory device is turned on, the host device obtains write protection information from the control chip via the specific transmission interface, in order to enable a write protection function according to a program code, wherein the specific transmission interface is different from the transmission interface of the control chip.

10. The electronic device of claim 9, wherein the memory device is a memory card conforming to a secure digital (SD) specification, and the specific transmission interface comprise a General-Purpose Input/Output (GPIO), a System Management Bus (SMBus), an Inter-Integrated Circuit (I2C) Bus, a Universal Serial Bus (USB) or a Peripheral Component Interconnect Express (PCIe) interface.

11. The electronic device of claim 9, wherein the specific transmission interface is further configured to transmit temperature information or assist the host device to perform error handling.

12. The electronic device of claim 9, wherein the memory device is a memory card conforming to a secure digital (SD) specification, and the first transmission interface is a Peripheral Component Interconnect Express (PCIe) interface.

13. The electronic device of claim 9, wherein the first transmission interface is a bypass path without performing protocol translation.

14. The electronic device of claim 9, wherein the second transmission interface utilizes a bridge circuit within the control chip to perform a translation between a second protocol and the first protocol.

* * * * *